United States Patent
Morimoto

(10) Patent No.: US 7,444,511 B2
(45) Date of Patent: Oct. 28, 2008

(54) LAN THAT ALLOWS NON-AUTHENTICATED EXTERNAL TERMINAL STATION TO ACCESS A PREDETERMINED DEVICE IN LAN

(75) Inventor: Shinichi Morimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1038 days.

(21) Appl. No.: 09/963,261

(22) Filed: Sep. 26, 2001

(65) Prior Publication Data
US 2002/0041689 A1 Apr. 11, 2002

(30) Foreign Application Priority Data
Oct. 5, 2000 (JP) ............................. 2000-306420

(51) Int. Cl.
*H04L 9/00* (2006.01)
*G06F 15/173* (2006.01)
*G06F 11/00* (2006.01)
*G06F 12/14* (2006.01)
*G06F 12/16* (2006.01)

(52) U.S. Cl. .................. 713/168; 713/153; 713/170; 726/23; 709/225; 709/239

(58) Field of Classification Search ................ 713/168, 713/153, 170; 709/225, 239; 726/23
See application file for complete search history.

(56) References Cited

U.S. PATENT DOCUMENTS

| | | | | |
|---|---|---|---|---|
| 5,819,178 A * | 10/1998 | Cropper | .................... | 455/433 |
| 6,115,376 A * | 9/2000 | Sherer et al. | ................ | 370/389 |
| 6,236,852 B1 * | 5/2001 | Veerasamy et al. | .......... | 455/411 |
| 6,307,837 B1 * | 10/2001 | Ichikawa et al. | ........... | 370/230 |
| 6,397,056 B1 * | 5/2002 | Bugnon et al. | ............. | 455/411 |
| 6,408,391 B1 * | 6/2002 | Huff et al. | .................. | 713/201 |
| 6,532,493 B1 * | 3/2003 | Aviani et al. | ................ | 709/224 |
| 6,587,684 B1 * | 7/2003 | Hsu et al. | ................... | 455/419 |
| 6,606,491 B1 * | 8/2003 | Peck | .......................... | 455/411 |
| 6,873,609 B1 * | 3/2005 | Jones et al. | ................. | 370/329 |
| 2002/0046179 A1 * | 4/2002 | Kokudo | ...................... | 705/51 |
| 2003/0074568 A1 * | 4/2003 | Kinsella et al. | ............ | 713/186 |

(Continued)

FOREIGN PATENT DOCUMENTS

JP 9-252323 9/1997

(Continued)

OTHER PUBLICATIONS

Decasper, Dan et al. "Router Plugins: A Software Architecture for Next Generation Routers", 1998 ACM.*

(Continued)

*Primary Examiner*—Kambiz Zand
*Assistant Examiner*—Michael J Simitoski
(74) *Attorney, Agent, or Firm*—Dickstein Shapiro LLP

(57) ABSTRACT

The wireless base station determines whether or not each wireless terminal station accessing to the wireless base station is authenticated for the access to the LAN. Thereafter, the wireless base station stores the result of the determination to the packet distributing table. When the wireless base station receives a packet from any wireless terminal station, the wireless base station determines whether or not the wireless terminal station transmitted the packet is authenticated. If the wireless terminal station is authenticated, the packet is transmitted to the LAN. On the other hand, if the wireless terminal station is not authenticated, the packet is transmitted to the server or the gateway.

10 Claims, 8 Drawing Sheets

U.S. PATENT DOCUMENTS

2005/0048950 A1 * 3/2005 Morper .................. 455/410

FOREIGN PATENT DOCUMENTS

| JP | 11-177582 | 7/1999 |
| JP | 11-205388 | 7/1999 |
| JP | 2001016646 A * | 1/2001 |
| WO | WO 03096554 A2 * | 11/2003 |

OTHER PUBLICATIONS

Nishida et al. DERWENT translation entry for JP2001016646A, 1999.*

* cited by examiner

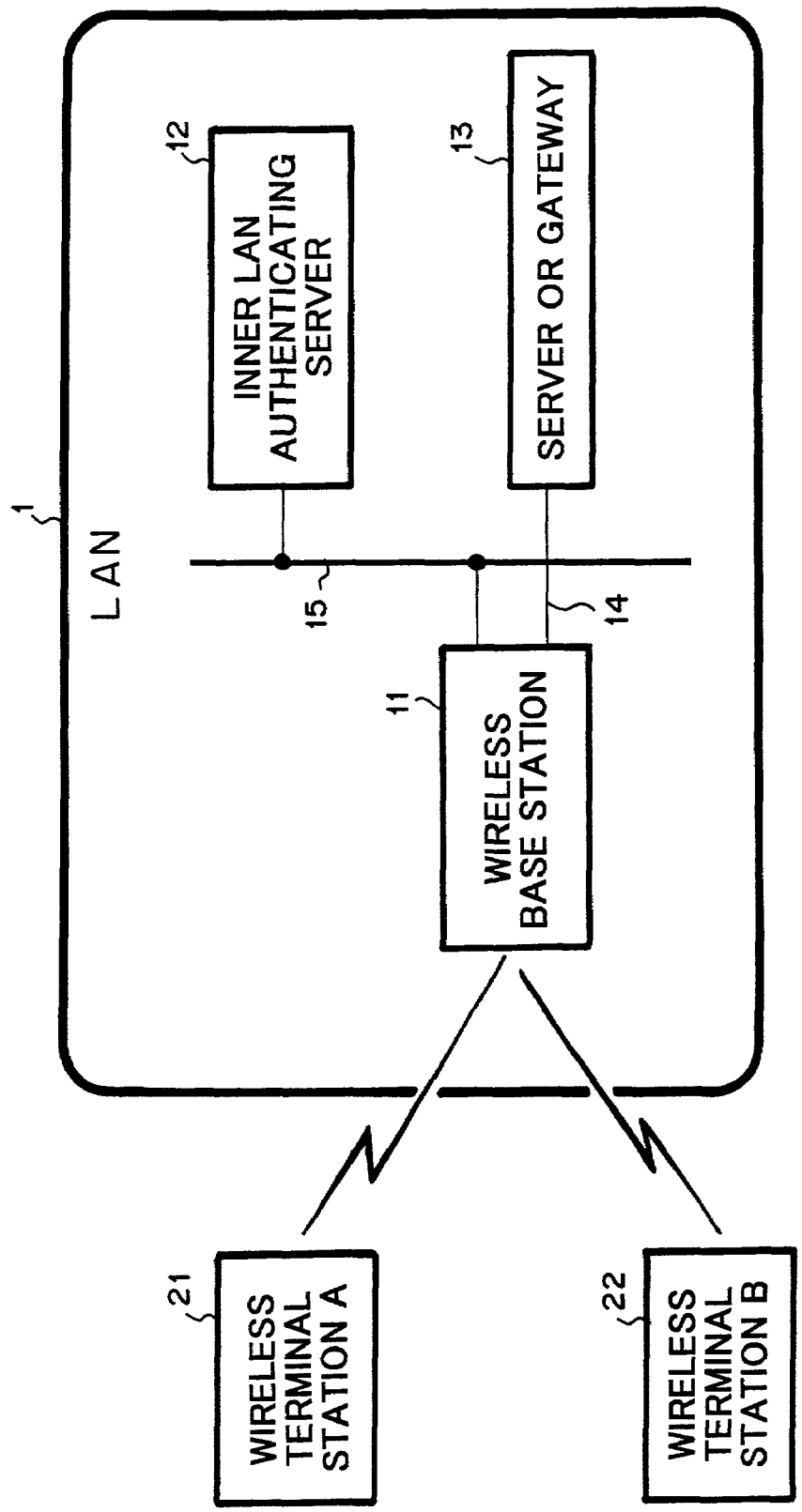

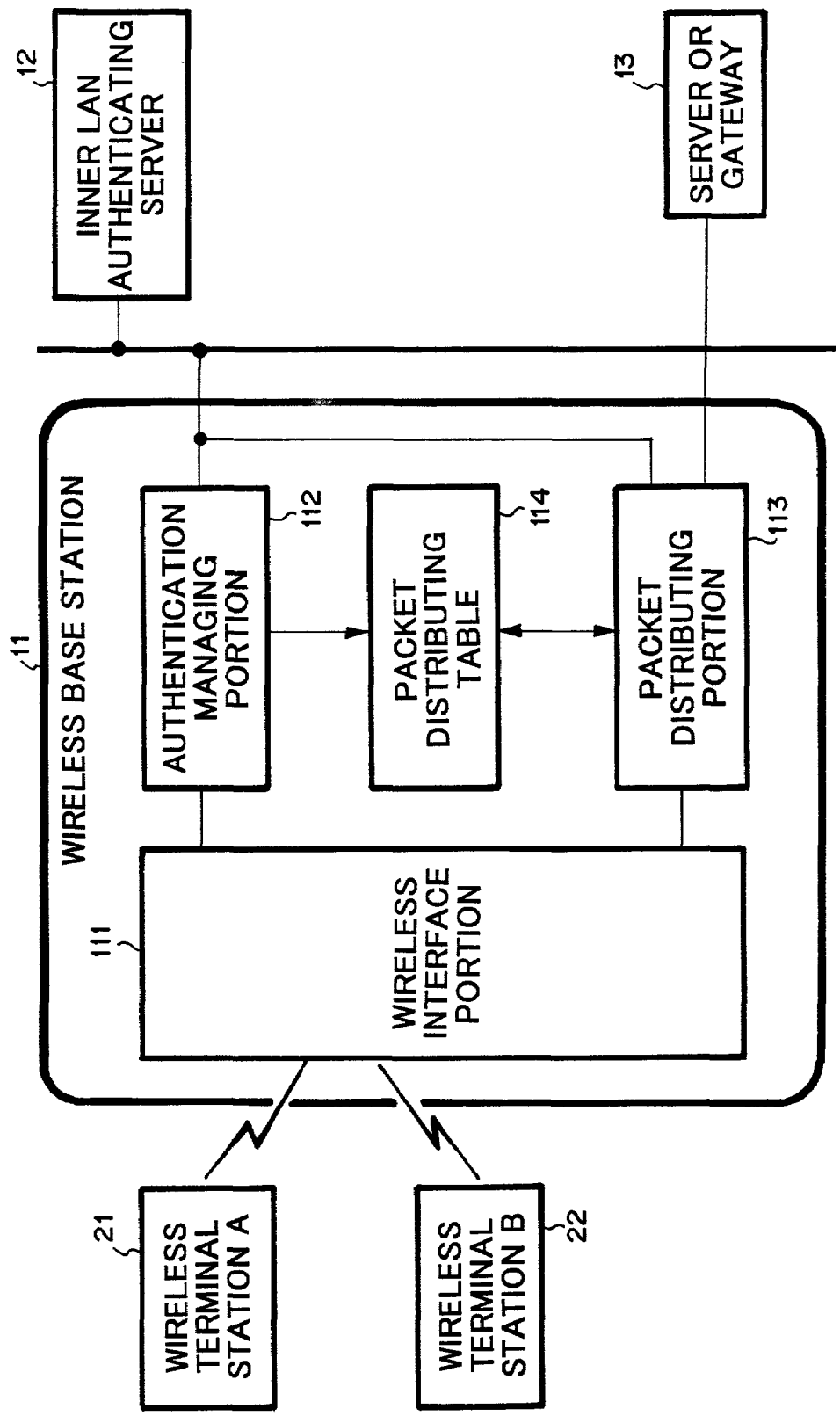

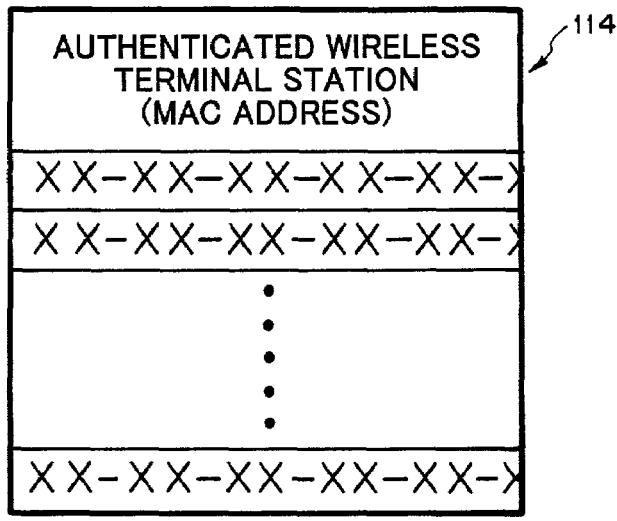
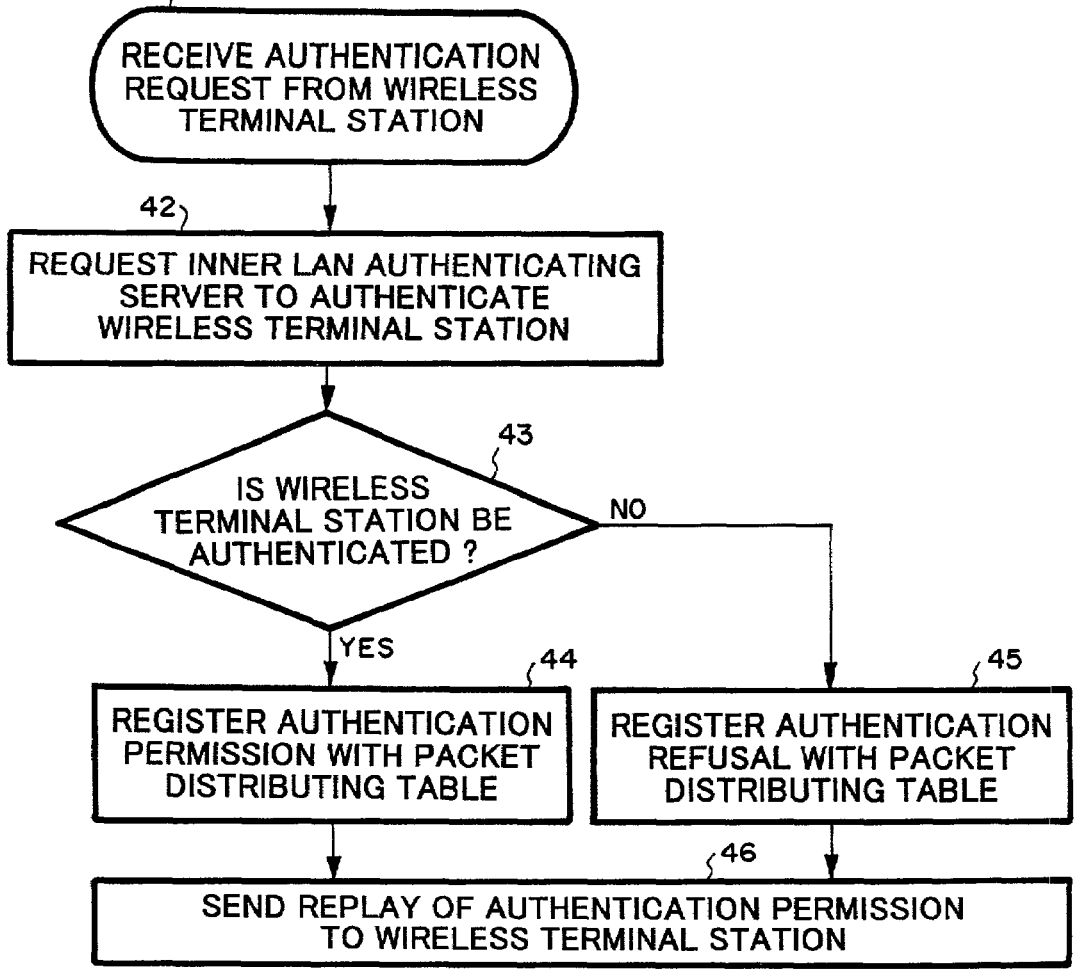

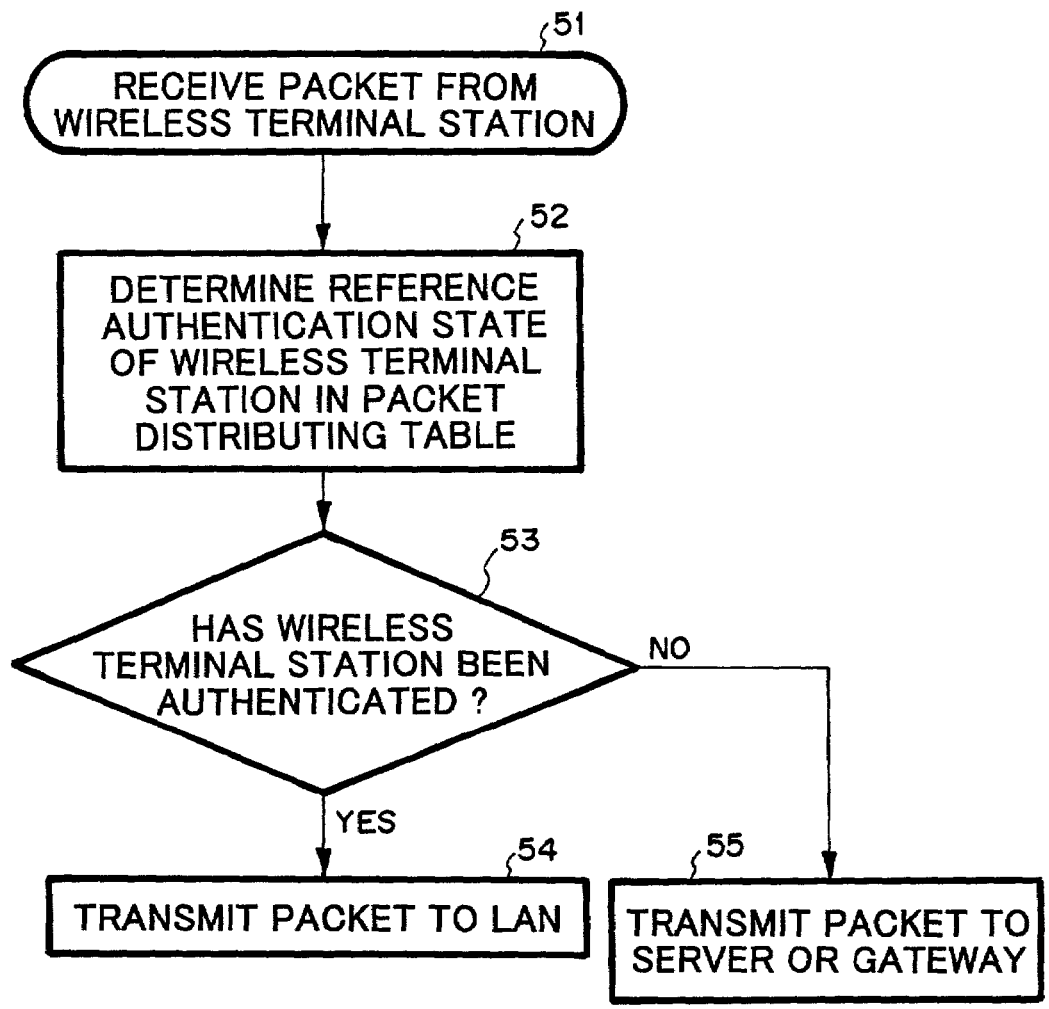

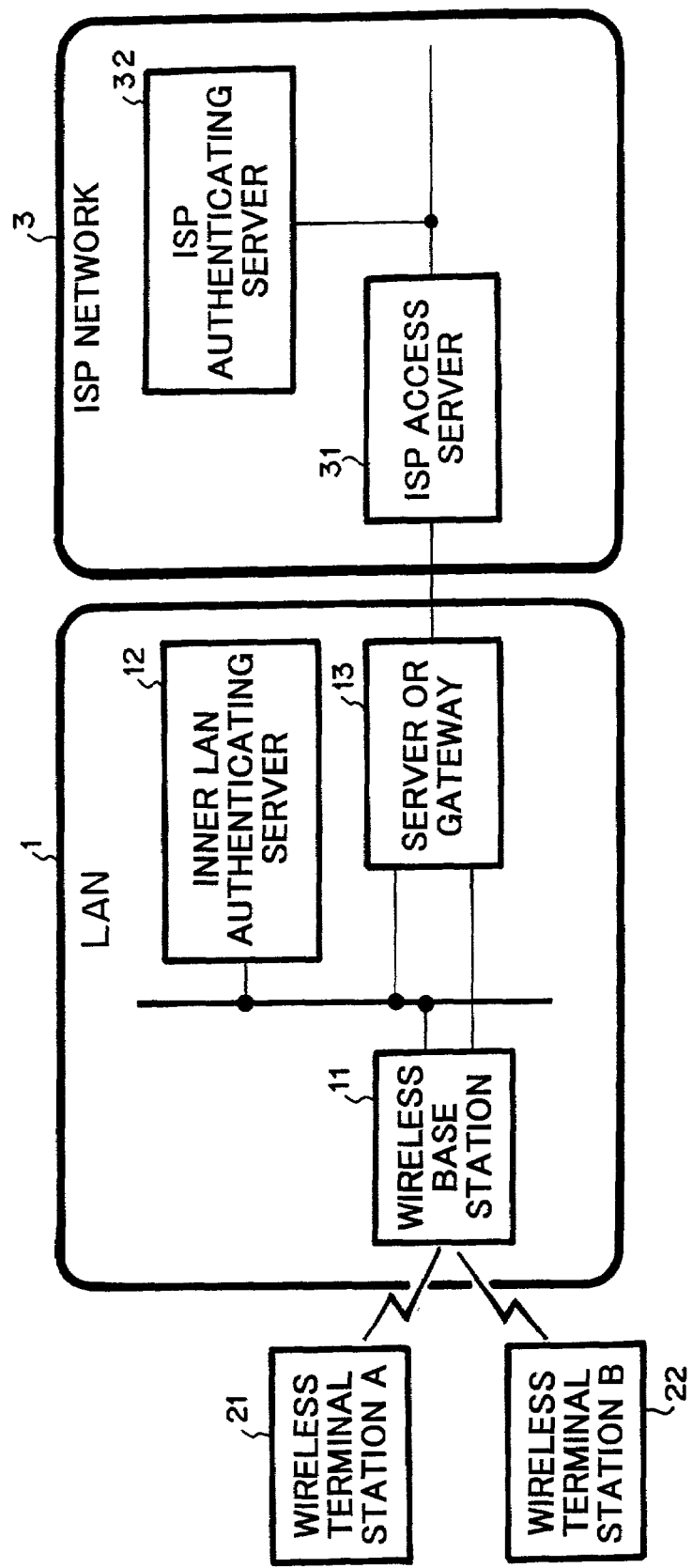

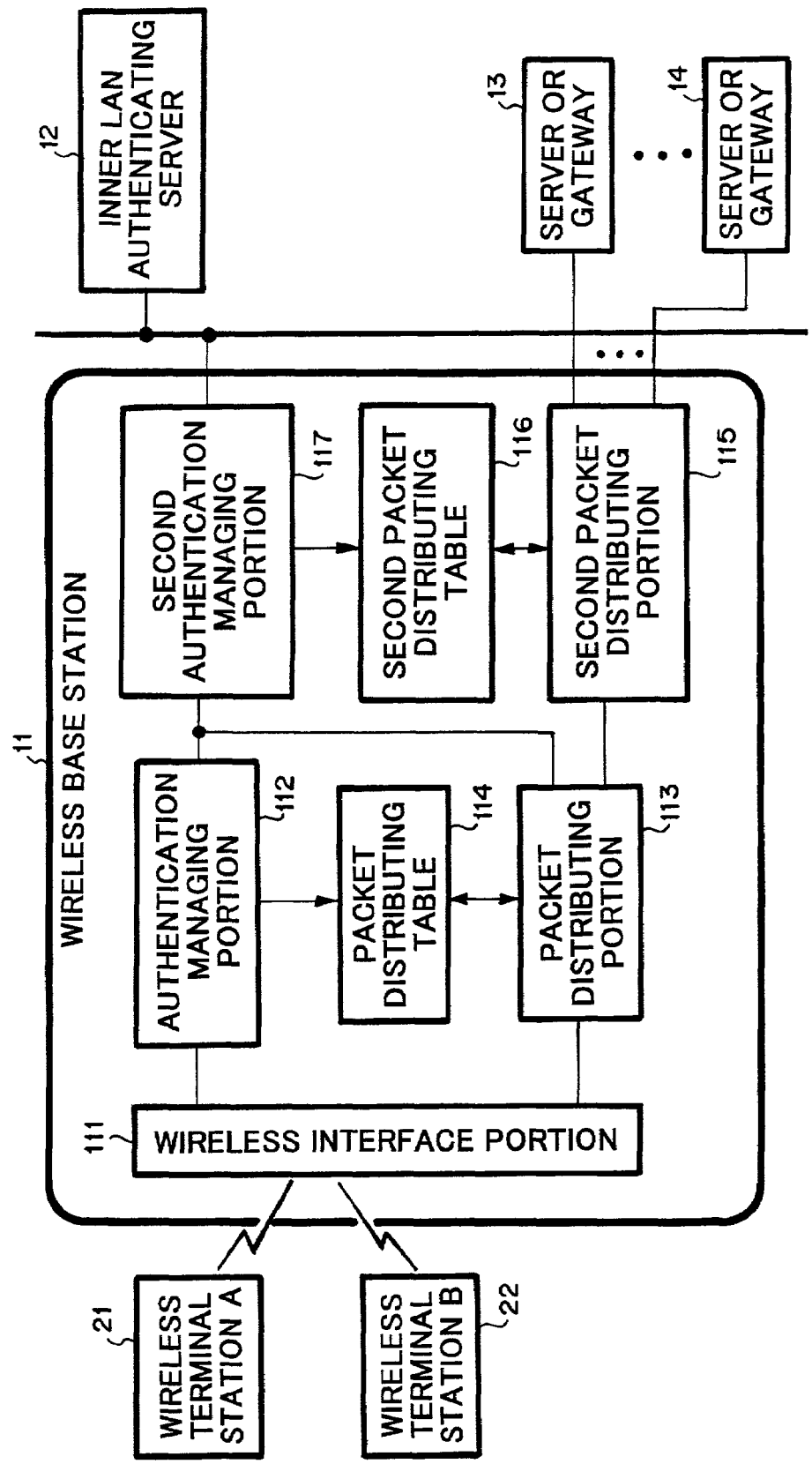

FIG.9

| WIRELESS TERMINAL STATION (MAC ADDRESS) | DESTINATION TO WHICH PACKET IS DISTRIBUTED |
|---|---|
| XX-XX-XX-XX-XX-X | 1 |
| XX-XX-XX-XX-XX-X | 2 |
| ⋮ | |
| XX-XX-XX-XX-XX-X | n |

LAN THAT ALLOWS NON-AUTHENTICATED EXTERNAL TERMINAL STATION TO ACCESS A PREDETERMINED DEVICE IN LAN

BACKGROUND OF THE INVENTION

1. Field of the Invention

The present invention relates to a LAN (Local Area Network) system that is suitable for a wireless network system and that causes a base station thereof to permit a non-authenticated external terminal station to access a predetermined server or network-connected device.

2. Description of the Prior Art

FIG. 1 shows the structure of a conventional wireless network system. Referring to FIG. 1, a wireless base station 11 of a LAN 1 receives an authentication request issued by a wireless terminal station 22 that is outside the LAN 1. Thereafter, the wireless base station 11 asks an inner LAN authenticating server 12 to authenticate the wireless terminal station 22. When the inner LAN authenticating server 12 does not authenticate the wireless terminal station 22, the wireless base station 11 disposes of packets received from the wireless terminal station 22. Alternatively, the wireless base station 11 unconditionally authenticates all wireless terminal stations.

In a prior art reference as JPA 11-205388 titled "Packet Filter Apparatus (translated title)" by Kazuo Hashimoto et. al., there are provided a direct path which connects a packet filtering apparatus with a private network and a firewall path which connects the packet filtering apparatus with the private network via a firewall. When the packet filtering apparatus receives a data packet from the private network, the packet filtering apparatus adds authentication information to the data packet and transmits the data packet to a public network. When the packet filtering apparatus receives a data packet from the firewall, the packet filtering apparatus transmits the data packet to the public network. In addition, when the packet filtering apparatus receives a data packet from the public network, the packet filtering apparatus determines whether or not authentication information is added to the data packet. If added, the packet filtering apparatus deletes the authentication information and transmits the data packet to the private network. If not added, the packet filtering apparatus transmits the data packet to the firewall.

However, the conventional wireless network system has the following disadvantages. In the wireless network system, if wireless terminal stations are not registered for authentication, a wireless base station does not permit the wireless terminal stations to access a LAN or a server. Thus, when conference attendees use the wireless terminal stations and the wireless base station, the wireless terminal stations must be registered for authentication beforehand. Alternatively, the wireless base station may unconditionally authenticate all the wireless terminal stations. However, in this case, when the wireless base station is connected to the LAN, the security of the system will be threatened.

SUMMARY OF THE INVENTION

In order to overcome the aforementioned disadvantages, the present invention has been made and accordingly, has an object to allow a base station to permit a non-authenticated terminal station to be connected to a predetermined server or network-connected device without need to register the terminal station to the LAN, thereby reducing the labor of the network supervisor and improving the convenience of the user of the terminal station.

According to a first aspect of the present invention, there is provided a LAN system for causing a base station that is inside a LAN to determine whether or not to authenticate a terminal station outside of the LAN and to permit the terminal station to access a predetermined server or network-connected device when the terminal station has not been authenticated, wherein the base station comprises: an interface portion for making a communication with the terminal station and extracting authentication request information and a reception packet therefrom; a first authentication managing portion for determining whether or not to authenticate the terminal station for the LAN corresponding to the authentication request information received from the interface portion and setting a result of the determination to a first packet distributing table; and a first packet distributing portion for referencing registered contents of the first packet distributing table for the packet received from the interface portion, transferring the packet received from the interface portion to the LAN when the contents of the first packet distributing table represent that the terminal station has been authenticated for the LAN, and transmitting the packet received from the interface portion to the predetermined server or network-connected device when the contents of the first packet distributing table represent that the terminal station has not been authenticated for the LAN.

In the LAN system, the base station may further comprise a second authentication managing portion; a second packet distributing portion; and a second packet distributing table for storing a plurality of destinations, wherein the second authentication managing portion is configured for determining whether or not to authenticate the terminal station corresponding to the authentication request information and setting a result of the concerned determination to the second packet distributing portion when the result of the determination of the first authentication managing portion represents that the terminal station has not been authenticated for the LAN, wherein the first packet distributing portion is configured for transferring the packet received from the terminal station to the second packet distributing portion when the registered contents of the first packet distributing table represent that the terminal station has not been authenticated for the LAN, and wherein the second packet distributing portion is configured for referencing the registered contents of the second packet distributing table for the packet received from the first packet distributing portion and transmitting the packet received from the terminal station to an appropriate server or network-connected device corresponding to a destination to which the packet is distributed.

In the LAN system, the first authentication managing portion may be configured for issuing an authentication request to an inner LAN authenticating server and setting a response to the authentication request to the first packet distributing table.

In the LAN system, the second authentication managing portion may be configured for issuing an authentication request to an inner LAN authenticating server and setting a response to the authentication request to the second packet distributing table.

According to a second aspect of the present invention, there is provided a LAN base station for determining whether or not to authenticate a terminal station outside of a LAN and permitting the terminal station to access a predetermined server or network-connected device when the terminal station has not been authenticated, the LAN base station comprising: an interface portion for making a communication with the terminal station and extracting authentication request information and a reception packet therefrom; a first authentication managing portion for determining whether or not to authenticate the terminal station for the LAN corresponding to the authentication request information received from the interface portion and setting a result of the determination to a first packet distributing table; and a first packet distributing portion for referencing registered contents of the first packet distributing table for the packet received from the interface portion, transferring the packet received from the interface portion to the LAN when the contents of the first packet distributing table represent that the terminal station has been authenticated for the LAN, and transmitting the packet received from the terminal station to the predetermined server or network-connected device when the registered contents of the first packet distributing table represent that the terminal station has not been authenticated for the LAN.

The LAN base station may further comprise: a second authentication managing portion; a second packet distributing portion; and a second packet distributing table for storing a plurality of destinations, wherein the second authentication managing portion is configured for determining whether or not to authenticate the terminal station corresponding to the authentication request information and setting a result of the concerned determination to the second packet distributing portion when the result of the determination of the first authentication managing portion represents that the terminal station has not been authenticated for the LAN, wherein the first packet distributing portion is configured for transferring the packet received from the terminal station to the second packet distributing portion when the registered contents of the first packet distributing table represent that the terminal station has not been authenticated for the LAN, and wherein the second packet distributing portion is configured for referencing the registered contents of the second packet distributing table for the packet received from the first packet distributing portion and transmitting the packet received from the terminal station to an appropriate server or network-connected device corresponding to a destination to which the packet is distributed.

In the LAN base station, the second authentication managing portion may be configured for issuing an authentication request to an inner LAN authenticating server and setting response to the authentication request to the first packet distributing table.

In the LAN base station, the second authentication managing portion may be configured for issuing an authentication request to an inner LAN authenticating server and setting response to the authentication request to the second packet distributing table.

According to a third aspect of the present invention, there is provided a method for distributing a packet from a terminal station that accesses a LAN base station from the outside of a LAN, the method comprising the steps of: determining whether or not to authenticate the terminal station for the LAN corresponding to an authentication request issued from the terminal station; registering an authentication permission with a first packet distributing table when a result of the determination represents that the terminal station has been authenticated; registering an authentication refusal with the first packet distributing table when the result of the determination represents that the terminal station has not been authenticated; sending an authentication permission response to the terminal station after registering the authentication permission or the authentication refusal with the first packet distributing table; receiving a packet from the terminal station and determining which of the authentication permission and the authentication refusal is registered with the first packet distributing table for the terminal station; transmitting the packet to the LAN when the authentication permission is registered with the first packet distributing table for the terminal; and transmitting the packet to a server or network-connected device when the authentication refusal is registered with the first packet distributing table for the terminal.

In packet distributing method, the base station may have a second packet distributing table for storing a plurality of destinations to which packets are distributed, and wherein the method may further comprise the step of: referencing the registered contents of the second packet distributing table for the packet received from the terminal station and transmitting the packet received from the terminal station to an appropriate server or network-connected device corresponding to a destination corresponding to the registered contents of the second packet distributing table when the authentication refusal is registered with the first packet distributing table for the terminal These and other objects, features and advantages of the present invention will become more apparent in light of the following detailed description of a best mode embodiment thereof, as illustrated in the accompanying drawings.

BRIEF DESCRIPTION OF DRAWINGS

FIG. 2 is schematic diagram showing an outlined structure of the present invention;

FIG. 3 is a schematic diagram showing a detailed structure of a wireless base station according to a first embodiment of the present invention;

FIG. 4 is a schematic diagram showing registered contents of a packet distributing table;

FIG. 5 is a flow chart showing the operation of an authentication managing portion of the wireless base station;

FIG. 6 is a flow chart showing the operation of a packet distributing portion of the wireless base station;

FIG. 7 is a schematic diagram showing the structure of a wireless base station according to a second embodiment of the present invention;

FIG. 8 is a schematic diagram showing the structure of a third embodiment of the present invention; and FIG. 9 is a schematic diagram showing registered contents of a second packet distributing table.

DESCRIPTION OF PREFERRED EMBODIMENTS

Figure 1:
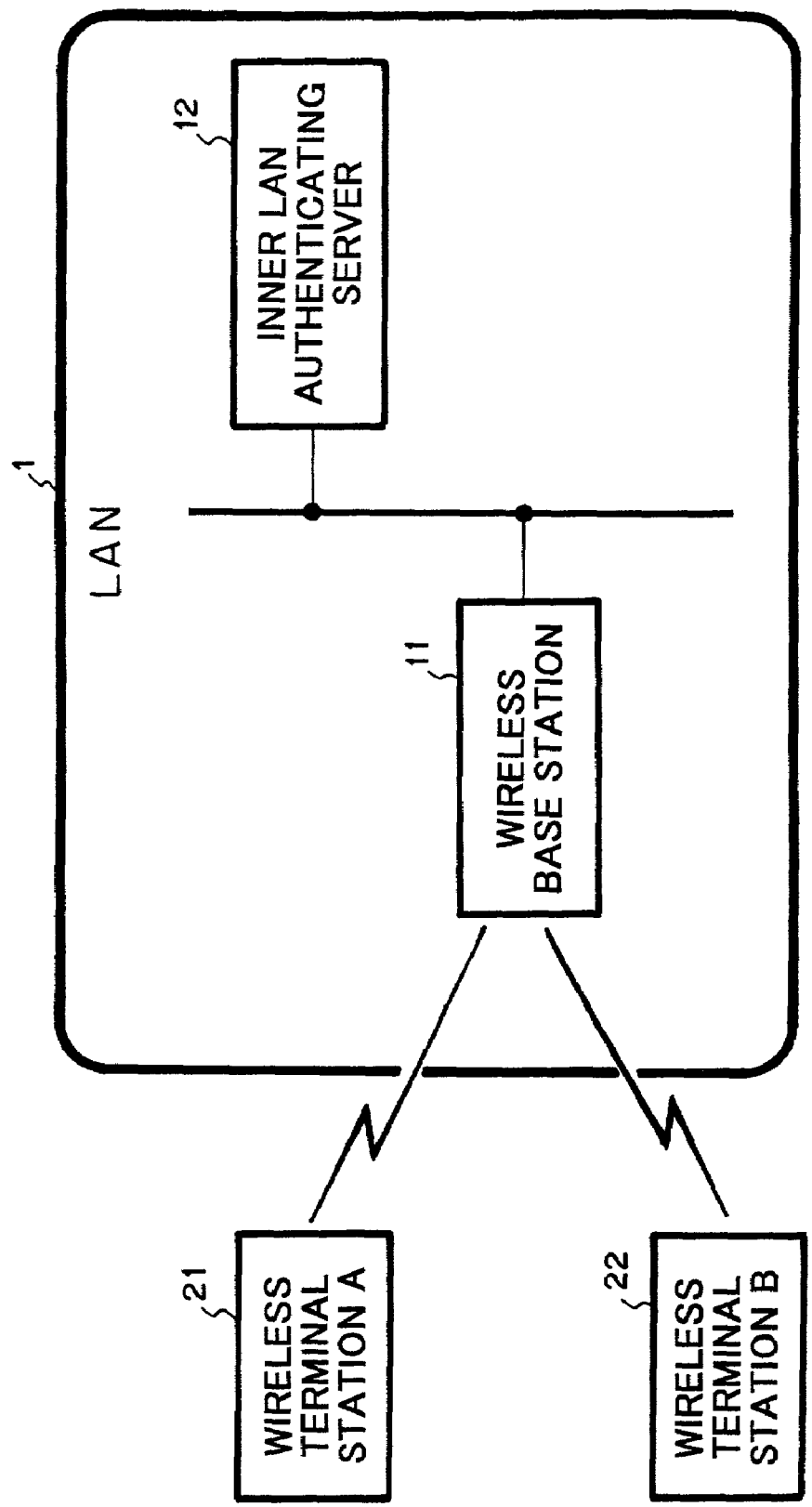
FIG. 1 is a schematic diagram showing the structure of a conventional wireless network system.

Next, with reference to the accompanying drawings, embodiments of the present invention will be described. In the following embodiments, a network using a wireless terminal station will be described. However, the present invention can be applied for a network using a wired terminal station. In the following description, similar portions to those in FIG. 1 will be denoted by similar reference numerals.

FIG. 2 shows an outlined structure of the present invention. In FIG. 2, a wireless base station 11 of a LAN determines whether or not to authenticate a wireless terminal station 22 that is outside the LAN corresponding to an authentication request issued by the wireless terminal station 22. Alternatively, the wireless base station 11 asks an inner LAN authenticating server 12 that has registered information on terminals which are accessible to the LAN to determine whether or not to authenticate the wireless terminal station 22. Even if the wireless terminal station 22 is not authenticated, the wireless base station 11 permits the wireless terminal station 22 to be connected to the wireless base station 11. The wireless base station 11 distributes packets transmitted from the non-authenticated wireless terminal station 22 and permits the wireless terminal station 22 to access only a predetermined server (or network-connected device such as a gateway or a router) 13. As shown in FIG. 2. the wireless base station 11 and the server 13 are connected with a dedicated line 14 that is physically different from a connection 15 of the LAN. Alternatively, the wireless base station 11 and the server 13 are connected as a logically dedicated line in the LAN such as a VPN (Virtual Private Network). The server 13 is for example a file server that stores conference materials or sales advertisements or a WWW server. The server 13 may be disposed in the wireless base station 11.

The wireless base station 11 may be a portable device which stores event programs and so forth of various events. In this case, only event staffs can access the LAN. Audiences of events who are refused to access the LAN can see only the contents of the server.

Next, with reference to FIG. 3, the wireless base station according to the first embodiment will be described in detail. The wireless base station 11 comprises a wireless interface portion 111, an authentication managing portion 112, a packet distributing table 114, and a packet distributing portion 113. The wireless interface portion 111 make communications with wireless terminal stations 21 and 22 and extracts authentication request information and reception packets therefrom. The authentication managing portion 112 determines whether or not to authenticate the wireless terminal stations 21 and 22 corresponding to the registered contents of an inner authentication table or the reply from the inner LAN authenticating server 12 against an authentication request based on authentication request information received from the wireless interface portion 111. The authentication managing portion 112 sets the obtained result to the packet distributing table 114. The packet distributing portion 113 references the registered contents of the packet distributing table 114 for a packet transmitted from the wireless interface portion 111. When the registered contents of the packet distributing table 114 represent that the wireless terminal station that has transmitted the packet has been authenticated, the packet distributing portion 113 transfers the packet to the LAN. When the registered contents of the packet distributing table 114 represent that the wireless terminal station that has transmitted the packet has not been authenticated, the packet distributing portion 113 transmits the packet to the predetermined server or gateway 13.

FIG. 4 shows the registered contents of the packet distributing table 114. The packet distributing table 114 manages wireless terminal stations with MAC (Media Access Control) addresses. Packets with MAC addresses are transferred to the LAN. The packet distributing table 114 can also be used as the above-described base station authenticating table.

In such a manner, according to the present invention, a packet transmitted from a non-authenticated terminal station (that has not been authenticated in the LAN) is distributed so as to permit the non-authenticated terminal station to access only a predetermined server (that includes a server that composes a firewall such as a proxy server) Thus, visitors who are outsiders of the company can be connected to an ISP (Internet Service Provider) through a wireless base station. Thus, the users' convenience can be improved. When a wireless base station is disposed in a shopping mall, since the wireless base station permits wireless terminal stations to access only a server that stores sales advertisement data, advertisement effects can be obtained.

Next, with reference to flow charts of FIGS. 5 and 6, the packet distributing operation of the wireless base station 11 will be described. FIG. 5 is a flow chart showing the operation of the authentication managing portion 112 of the wireless base station 11. The flow chart shown in FIG. 5 deals with a sequence from a step at which an authentication request is received from the wireless terminal station 22 through the wireless interface portion 111 to a step at which authentication data is registered with the packet distributing table 114 and then authentication reply is sent to the wireless terminal station 22. FIG. 6 is a flow chart showing the operation of the packet distributing portion 113 of the wireless base station 11. The flow chart shown in FIG. 6 deals with a sequence from a step at which a packet is received from the wireless terminal station 22 through the wireless interface portion 111 to a step at which the packet distributing table 114 is referenced for the received packet and the packet is distributed.

In FIG. 5, when an authentication request is received from the wireless terminal station 22 (at step 41), the wireless base station 11 requests the inner LAN authenticating server 12 to authenticate the wireless terminal station 22 (at step 42). When the reply from the inner LAN authenticating server 12 represents that the wireless terminal station 22 can be authenticated (YES at step 43), the wireless base station 11 registers an authentication permission for the wireless terminal station 22 with the packet distributing table 114 (at step 44). Thereafter, the wireless base station 11 sends an authentication permission reply to the wireless terminal station 22 (at step 46). When the reply of the inner LAN authenticating server 12 represents that the wireless terminal station 22 cannot be authenticated (NO at step 43), the inner LAN authenticating server 12 registers an authentication refuse for the wireless terminal station 22 with the packet distributing table 114 (at step 45) Thereafter, the wireless base station 11 sends an authentication permission reply to the wireless terminal station 22 (at step 46).

In FIG. 6, when the packet distributing portion 113 receives a packet from the wireless terminal station 22 (at step 51), the packet distributing portion 113 determines the authentication registration state of the wireless terminal station 22 in the packet distributing table 114 (at step 52). When the result represents that wireless terminal station 22 has been authenticated (YES at step 53), the packet distributing portion 113 transmits the packet to the LAN (at step 54). When the result represents that wireless terminal station 22 has not been authenticated (NO at step 53), the packet distributing portion 113 transmits the packet to the predetermined server or gateway (at step 55).

Next, a second embodiment of the present invention will be described. The basic structure of the second embodiment is the same as that of the first embodiment except that an ISP (Internet Service Provider) is connected with the server or the gateway.

FIG. 7 shows the structure of a wireless base station according to the second embodiment. Referring to FIG. 7, a wireless base station 11 of a LAN 1 authenticates a wireless terminal station 22 corresponding to an authentication request issued therefrom. Alternatively, the wireless base station 11 asks an inner LAN authenticating server 12 to authenticate the wireless terminal station 22. Even if the wireless base station 11 or the authenticating server 12 has not authenticated the wireless terminal station 22, the wireless base station 11 permits the wireless terminal station 22 to be connected thereto. The wireless base station 11 distributes packets that are transmitted from the wireless terminal station 22 so that the wireless terminal station 22 can access only a server 13 that composes a firewall. Thus, the wireless terminal station 22 can be connected to an ISP access server 31 of an ISP network 3 that has registered the wireless terminal station 22. The ISP access server 31 asks an ISP authenticating server 32 to authenticate the wireless terminal station 22. When the ISP authenticating server 32 has authenticated the wireless terminal station 22, the ISP access server 31 permits the wireless terminal station 22 to be connected thereto through the server 13. When the ISP authenticating server 32 has not authenticated the wireless terminal station 22, the ISP access server 31 does not permit the wireless terminal station 22 to be connect thereto.

Next, a third embodiment of the present invention will be described. According to the third embodiment, a packet transmitted from a non-authenticated wireless terminal station 22 for a LAN 1 is distributed to a plurality of destinations so that the wireless terminal station 22 is connected to an appropriate ISP corresponding to user information of the wireless terminal station 22.

FIG. 8 shows the structure of the third embodiment. The structure of the third embodiment shown in FIG. 8 is different from the structure of the first embodiment shown in FIG. 3 in that a wireless base station 11 has a second authentication managing portion 117, a second packet distributing portion 115, and a second packet distributing table 116. The second packet distributing table 116 stores a plurality of designations to which packets are distributed. The plurality of designations are set by the manager of the wireless base station beforehand or copied from the description of the designations included in the authentication requests from respective wireless terminal stations A wireless interface portion 111 makes communications with wireless terminal stations 21 and 22 and extracts authentication request information and packets therefrom. An authentication managing portion 112 determines whether or not to authenticate the wireless terminal stations 21 and 22 corresponding to the authentication request information received from the wireless interface portion 111. Alternatively, the authentication managing portion 112 asks the inner LAN authenticating server 12 to determine whether or not authenticate the wireless terminal stations 21 and 22. The authentication managing portion 112 sets the determined result to a packet distributing table 114. When the determined result of the authentication managing portion 112 represents that the wireless terminal stations 21 and 22 have not been authenticated, a second authentication managing portion 117 determines whether or not to authenticate the wireless terminal stations 21 and 22 using an internal authenticating table corresponding to authentication request information. Alternatively, the second authentication managing portion 117 asks an external authenticating server to determine whether or not to authenticate the wireless terminal stations 21 and 22. The second authentication managing portion 117 sets the determined result to the second packet distributing table 116.

A packet distributing portion 113 references the registered contents of the packet distributing table 114 for a packet transmitted from the wireless interface portion 111. When the registered contents represent that the wireless terminal station has been authenticated, the packet distributing portion 113 transfers the packet to the LAN. When the registered contents represent that the wireless terminal station has not been authenticated, the packet distributing portion 113 transfers the packet to the second packet distributing portion 115. When the second packet distributing portion 115 receives the packet, the second packet distributing portion 115 references the second packet distributing table 116 for the destination of the packet and transmits the packet to an appropriate server or gateway 13 or 14 corresponding to the referenced result.

Alternatively, without the second authentication managing portion 117, the authentication managing portion 112 may have a function for setting user data (domain names, destination ISP names, or the like) of the wireless terminal stations 21 and 22 to the second packet distributing table 116.

FIG. 9 shows the registered contents of the second packet distributing table 116. The second packet distributing table 116 manages wireless terminal stations with MAC addresses. The second packet distributing table 116 also contains destinations.

Since packets are distributed to respective designations, a wireless terminal station can be connected to an appropriate ISP. Thus, the number of wireless terminal stations that are connected to each ISP can be increased.

As was described above, according to the present invention, even if a LAN does not authenticate a terminal station that is outside the LAN, the terminal station can be connected to an ISP (Internet Service Provider) through a gateway. Thus, the user's convenience of the terminal station can be improved. In addition, when the user of a non-authorized terminal station for a LAN can be connected to a predetermined server that stores advertisement contents, advertisements can be easily performed. In addition, since a non-authenticated terminal station is forcedly connected to a predetermined server or network-connected device such as a gateway, the security of the LAN can be maintained.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A LAN system for causing a base station that is inside a LAN to determine whether or not to authenticate a terminal station outside of said LAN and to permit said terminal station to access a predetermined server or network-connected device when said terminal station has not been authenticated, wherein said base station comprises:

an interface portion for making a communication with said terminal station and extracting authentication request information and a reception packet therefrom;

a first authentication managing portion for determining whether or not to authenticate said terminal station for said LAN corresponding to a response from an inner LAN authenticating server responding to said authentication request information received from said interface portion and setting a result of the determination to a first packet distributing table; and a first packet distributing portion for referencing registered contents of said first packet distributing table for the packet received from said interface portion, transferring the packet received from said interface portion to said LAN when said contents of said first packet distributing table represent that said terminal station has been authenticated for said LAN, and transmitting the packet received from said interface portion to said predetermined server or network-connected device when said contents of said first packet distributing table represent that said terminal station has not been authenticated for said LAN.

2. The LAN system as set forth in claim 1, wherein said base station further comprises:
a second authentication managing portion;
a second packet distributing portion; and
a second packet distributing table for storing a plurality of destinations,
wherein said second authentication managing portion is configured for determining whether or not to authenticate said terminal station corresponding to said authentication request information and setting a result of a concerned determination to said second packet distributing portion when the result of the determination of said first authentication managing portion represents that said terminal station has not been authenticated for said LAN, wherein said first packet distributing portion is configured for transferring the packet received from said terminal station to said second packet distributing portion when said registered contents of said first packet distributing table represent that said terminal station has not been authenticated for said LAN, and wherein said second packet distributing portion is configured for referencing the registered contents of said second packet distributing table for the packet received from said first packet distributing portion and transmitting the packet received from said terminal station to an appropriate server or network-connected device corresponding to a destination to which the packet is distributed.

3. The LAN system as set forth in claim 2, wherein said second authentication managing portion is configured for issuing an authentication request to an inner LAN authenticating server and setting a response to the authentication request to said second packet distributing table.

4. The LAN system as set forth in claim 1, wherein said first authentication managing portion is configured for issuing an authentication request to an inner LAN authenticating server and setting a response to the authentication request to said first packet distributing table.

5. A LAN base station for determining whether or not to authenticate a terminal station outside of a LAN and permitting said terminal station to access a predetermined server or network-connected device when said terminal station has not been authenticated, said LAN base station comprising:

an interface portion for making a communication with said terminal station and extracting authentication request information and a reception packet therefrom;

a first authentication managing portion for determining whether or not to authenticate said terminal station for said LAN corresponding to a response from an inner LAN authenticating server responding said authentication request information received from said interface portion and setting a result of the determination to a first packet distributing table; and a first packet distributing portion for referencing registered contents of said first packet distributing table for the packet received from said interface portion, transferring the packet received from said interface portion to said LAN when the contents of said first packet distributing table represent that said terminal station has been authenticated for said LAN, and transmitting the packet received from said terminal station to said predetermined server or network-connected device when the registered contents of said first packet.distributing table represent that said terminal station has not been authenticated for said LAN.

6. The LAN base station as set forth in claim 5, further comprising:

a second authentication managing portion;

a second packet distributing portion; and a second packet distributing table for storing a plurality of destinations, wherein said second authentication managing portion is configured for determining whether or not to authenticate said terminal station corresponding to said authentication request information and setting a result of a concerned determination to said second packet distributing portion when the result of the determination of said first authentication managing portion represents that said terminal station has not been authenticated for said LAN, wherein said first packet distributing portion is configured for transferring the packet received from said terminal station to said second packet distributing portion when said registered contents of said first packet distributing table represent that said terminal station has not been authenticated for said LAN, and wherein said second packet distributing portion is configured for referencing the registered contents of said second packet distributing table for the packet received from said first packet distributing portion and transmitting the packet received from said terminal station to an appropriate server or network-connected device corresponding to a destination to which the packet is distributed.

7. The LAN base station as set forth in claim 6, wherein said second authentication managing portion is configured for issuing an authentication request to an inner LAN authenticating server and setting response to the authentication request to said second packet distributing table.

8. The LAN base station as set forth in claim 5, wherein said second authentication managing portion is configured for issuing an authentication request to an inner LAN authenticating server and setting response to the authentication request to said first packet distributing table.

9. A method for distributing a packet from a terminal station that accesses a LAN base station from the outside of a LAN, said method comprising the steps of:

determining whether or not to authenticate said terminal station for said LAN corresponding to a response from an inner LAN authenticating server responding to an authentication request issued from said terminal station;

registering an authentication permission with a first packet distributing table when a result of the determination represents that said terminal station has been authenticated;

registering an authentication refusal with said first packet distributing table when the result of the determination represents that said terminal station has not been authenticated;

sending an authentication permission response to said terminal station after registering said authentication permission or said authentication refusal with said first packet distributing table;

receiving a packet from said terminal station and determining which of said authentication permission and said authentication refusal is registered with said first packet distributing table for said terminal station;

transmitting the packet to said LAN when said authentication permission is registered with said first packet distributing table for said terminal; and transmitting the packet to a server or network-connected device when said authentication refusal is registered with said first packet distributing table for said terminal.

10. The packet distributing method as set forth in claim 9, wherein said base station has a second packet distributing table for storing a plurality of destinations to which packets are distributed, and wherein said method further comprises the step of:

referencing the registered contents of said second packet distributing table for the packet received from said terminal station and transmitting the packet received from said terminal station to an appropriate server or network-connected device corresponding to a destination corresponding to the registered contents of said second packet distributing table when said authentication refusal is registered with said first packet distributing table for said terminal.

\* \* \* \* \*